US009027079B2

(12) United States Patent
Comay et al.

(10) Patent No.: US 9,027,079 B2
(45) Date of Patent: *May 5, 2015

(54) METHOD AND SYSTEM FOR DYNAMIC SECURITY USING AUTHENTICATION SERVERS

(71) Applicant: ForeScout Technologies, Inc., Campbell, CA (US)

(72) Inventors: Oded Comay, Tel Aviv (IL); Doron Shikmoni, Ganey Tikva (IL)

(73) Assignee: ForeScout Technologies, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/082,217

(22) Filed: Nov. 18, 2013

(65) Prior Publication Data
US 2014/0075504 A1    Mar. 13, 2014

Related U.S. Application Data

(63) Continuation of application No. 12/527,426, filed as application No. PCT/IL2008/000197 on Feb. 14, 2008, now Pat. No. 8,590,004.

(60) Provisional application No. 60/890,198, filed on Feb. 16, 2007.

(51) Int. Cl.
*H04L 9/00* (2006.01)
*H04L 9/32* (2006.01)
*H04L 29/06* (2006.01)

(52) U.S. Cl.
CPC ............ *H04L 63/20* (2013.01); *H04L 63/0892* (2013.01); *H04L 63/10* (2013.01); *H04L 63/08* (2013.01)

(58) Field of Classification Search
USPC .......... 726/1–5, 11, 15, 22–23; 713/159, 155, 713/168; 709/217, 224–225, 229
See application file for complete search history.

(56) References Cited

U.S. PATENT DOCUMENTS

| 7,310,734 | B2 * | 12/2007 | Boate et al. ................... 713/186 |
| 7,325,134 | B2 * | 1/2008 | Fascenda ...................... 713/169 |
| 7,444,508 | B2 * | 10/2008 | Karjala et al. ................. 713/156 |
| 7,788,705 | B2 * | 8/2010 | Bruestle et al. ................... 726/4 |
| 7,827,593 | B2 * | 11/2010 | Smith et al. ....................... 726/3 |
| 8,590,004 | B2 * | 11/2013 | Comay et al. ..................... 726/1 |

* cited by examiner

*Primary Examiner* — Hosuk Song
(74) *Attorney, Agent, or Firm* — Vladimir Sherman; Professional Patent Solutions (57) ABSTRACT

Disclosed is a method and system for network access control, including an authentication proxy that authenticates different access-points, retrieves data from security databases and from Network Monitoring Systems, processing said data according to a dynamic security policy and using said processing outcome to determine the access level which will be granted to an access point in the network.

20 Claims, 8 Drawing Sheets

METHOD AND SYSTEM FOR DYNAMIC SECURITY USING AUTHENTICATION SERVERS

PRIORITY CLAIMS

This application is a continuation of U.S. patent application Ser. No. 12/527,426, entitled "A METHOD AND SYSTEM FOR DYNAMIC SECURITY USING AUTHENTICATION SERVERS", filed in the USPTO on Aug. 16, 2009, by the inventors of the present application;
U.S. patent application Ser. No. 12/527,426, is a 371 application of POT Application PCT/IL2008/000197, entitled "A METHOD AND SYSTEM FOR DYNAMIC SECURITY USING AUTHENTICATION SERVER", said POT International Application being filed on Feb. 14, 2008, by the inventors of the present application;
and
PCT Application PCT/IL2008/000197 claims, in turn, priority from U.S. Provisional Patent Application No. 60/890,198, entitled "A METHOD AND SYSTEM FOR DYNAMIC SECURITY USING AUTHENTICATION SERVER", filed in the USPTO on Feb. 16, 2007; by the inventors of the present application;
all of the aforementioned applications are hereby incorporated herein by reference in their entirety.

FIELD OF THE INVENTION

The present invention relates generally to the field of network security and management. More specifically, the present invention relates to a method and system for creating a dynamic security policy with authentication servers.

BACKGROUND

In computer security, AAA stands for "authentication, authorization and accounting".

Authentication refers to the confirmation that a user who is requesting services is a valid user of the network services requested. Authentication is accomplished via the presentation of an identity and credentials. Examples of types of credentials are passwords, one-time tokens, digital certificates, and phone numbers (calling/called).

Authorization refers to the granting of specific types of service (including "no service") to a user, based on their authentication, what services they are requesting and the current system state. Authorization may be based on restrictions; for example time-of-day restrictions, physical location restrictions or restrictions against multiple logins by the same user. Authorization determines the nature of the service which is granted to a user. Examples of types of service include, but are not limited to: IP address filtering, address assignment, route assignment, QoS/differential services, bandwidth control/traffic management, compulsory tunneling to a specific endpoint and encryption.

Accounting refers to the tracking of the consumption of network resources by users. This information may be used for management, planning, billing and/or other purposes. Real-time accounting refers to accounting information that is delivered concurrently with the consumption of the resources. Batch accounting refers to accounting information that is saved until it is delivered at a later time. Typical information that is gathered in accounting is the identity of the user, the nature of the service delivered, when the service began and when it ended.

Some ISPs (commonly modem, DSL, or wireless 802.11 services) require you to enter a username and password in order to connect to the Internet. Before access to the network is granted, this information is passed to a Network Access Server (NAS) device over the Point-to-Point Protocol (PPP) and then to a RADIUS server over the RADIUS protocol. The RADIUS server checks that the information is correct using authentication schemes like PAP, CHAP or EAP. If accepted, the server will then authorize access to the ISP system and select an IP address, L2TP parameters, etc.

The RADIUS server will also be notified if and when the session starts and stops, so that the user can be billed accordingly; or the data can be used for statistical purposes.

Additionally, RADIUS is widely used by VoIP service providers. It is used to pass login credentials of a SIP end point (like a broadband phone) to a SIP Registrar using digest authentication, and then to RADIUS server using RADIUS. Sometimes it is also used to collect call detail records (CDRs) later used, for instance, to bill customers for international long distance.

RADIUS was originally developed by Livingston Enterprises for their PortMaster series of Network Access Servers, but later (1997) published as RFC 2058 and RFC 2059 (current versions are RFC 2865 and RFC 2866). Now, several commercial and open-source RADIUS servers exist. Features can vary, but most can look up the users in text files, LDAP servers, various databases, etc. Accounting tickets can be written to text files, various databases, forwarded to external servers, etc. SNMP is often used for remote monitoring. RADIUS proxy servers are used for centralized administration and can rewrite RADIUS packets on the fly (for security reasons, or to convert between vendor dialects).

SUMMARY OF THE INVENTION

According to some embodiments of the present invention, there is provided a system and method for network access point authorization including an access policy module adapted to receive client authentication credentials from an access point through which the client is attempting to connect to network resources. According to some embodiments of the present invention, the policy module may be further adapted to respond to the access point based on data retrieved from a Remote Authentication Dial In User Service and from a Dynamic Security Data & Policy Database.

According to further embodiments of the present invention, the access policy module may be adapted to decide which methods of remotely connecting to a network are acceptable and which users/clients are allowed to access the network resources.

According to some embodiments of the present invention, a network may include various types of network resources, and a given network may include several distinct resources of the same type. Network resources may comprise software or hardware. A network resource may be associated with a state indicator, which may indicate the state of the resource.

According to some embodiments of the present invention, the access policy module may be part of a network access point authorization system. A network access point authorization system may also be referred to as a "Dynamic Security Authentication Service Proxy server" ("DSASP"). According to some further embodiments of the present invention, the DSASP may comprise: (1) an access policy module and (2) a Dynamic Security Data and Policy Database ("DSDPD"). According to further embodiments of the present invention, an access point through which a client is attempting to connect to network resources may have to complete an authorization and authentication process, which process may be performed by the access policy module. According to some embodiments of the present invention, an authentication and authorization process may include the step of sending an authorization request from an access point to an access policy module. According to some further embodiments of the present invention, an access point may be a VPN (Virtual Private Network), a client connected to a switch, a Dial-Up service, a WAP (wireless access point) or any other access point entity and/or program known today or to be devised in the future.

According to some further embodiments of the present invention, an authentication request may consist of credentials and/or information associated with the identity of the access point/client who attempts to log in to the network; an exemplary authorization request is the standard username and password parameters passed by a WAP. According to some further embodiments of the present invention, client authentication credentials may be issued by a Credential Service Provider ("CSP") and may be associated with the user's details.

According to some embodiments of the present invention, the access policy module may be adapted to receive an authentication request. According to some further embodiments of the present invention, the access policy module may receive the authentication request via a Network Access Server (NAS), a VPN concentrator, a Wireless Access-Point and/or a switch.

According to yet further embodiments of the present invention, the access policy module may receive messages using RADIUS protocol, DIAMETER protocol, TACACS+ protocol and/or any other communication protocol known today or to be devised in the future.

According to some embodiments of the present invention, the access policy module may be adapted to retrieve authentication information from one or more authentication servers selected from the group of: (1) Security Authentication servers (SAS), (2) other Security Authentication proxy server and/or (3) any other security or Identity Management Directory.

According to some embodiments of the present invention, the access policy module may retrieve raw authentication information/data from the above mentioned directories (for example: via network connection or other) and process them using authentication schemes (for example: PAP, CHAP or EAP).

According to some further embodiments of the present invention, the access policy module may retrieve processed data from one or more authentication servers, which processed data may comprise an indicator for the authorization or the non-authorization of an access point according to the authentication server.

According to some embodiments of the present invention, the DSDPD module may be adapted to receive security information from a Network Security and Monitoring System ("NSMS"). According to some further embodiments of the present invention, an NSMS may be a detection and policy enforcement system or any other system that may be adapted to limit the access of end systems to a network (For example—intrusion prevention systems (IPS) or NAC policy enforcement systems).

According to some embodiments of the present invention, the DSDPD module may comprise a data base of security policy rules and a computational logic module functionally coupled with the data base of security policy rules and may be adapted to enforce the security policy rules. According to some further embodiments of the present invention, the security policy rules may define the system's security, i.e. a set of rules and constraints regarding the identity and parameters of end systems which may receive authorization by the network access point authorization system.

According to some embodiments of the present invention, the DSDPD module may process an authorization request based on: (1) authentication information retrieved from external security and authentication servers and (2) security information received from the NSMS.

According to some further embodiments of the present invention, the data base of security policy rules may be modified, i.e. modify the security policy of the system. According to yet further embodiments of the present invention, the modification of a security policy may be performed by: (1) an authorized user and/or (2) another authorized security policy system.

According to some embodiments of the present invention, the access policy module may determine an authorization level of an access point based on its security policy and authentication data. According to some embodiments of the present invention, the access policy module may decide that the access point is: (1) fully authorized to log in the network, (2) not-authorized to log in the network, (3) partially authorized (authorized with restrictions) or (4) quarantined for further policy verification.

According to some embodiments of the present invention, the network access point authorization system may send via the authentication proxy module: (1) an authorization, (2) a non-authorization, (3) a partial-authorization or (4) a quarantine message to the access point and network.

According to yet further embodiments of the present invention, the access policy module may send and receive messages using RADIUS protocol, DIAMETER protocol and/or any other communication protocol known today or to be devised in the future.

An exemplary scenario of an access point which receives a partial-authorization may occur when a client tries to log in to the network via a switch. According to some further embodiments of the present invention, the DSPD may grant the client restricted access to the network in accordance with the client's credentials. An exemplary restricted access to network resources may be enforced by connecting to the network using a "restricted" vLAN.

According to some embodiments of the present invention, the DSPD may restrict access by choosing from a set of restricted vLAN's, for example, a qVLAN will stand for a Quarantine VLAN, which comprises certain limitations to the access given using this vLAN. According to further embodiments of the present invention, if additional compliance tests are required, the qVLAN may allow network access to the quarantined client while blocking all access from the quarantined client.

It should be understood by one of ordinary skill in the art that the devices, methods and systems according to some embodiments of the present invention may be implemented on top of an authentication proxy (such as a RADIUS proxy). The authentication proxy may receive authentication requests from clients and forward them to an authentication server. The authentication server may send an authentication response to the proxy, which proxy sends them back to the client. The invention may enhance the proxy functionality so it interacts with an external system (such as NAC or IPS), to which it: 1. Sends information extracted from the authentication transactions; and/or 2. Receives authentication/authorization instructions to limit or change the granted access rights.

DETAILED DESCRIPTION

In the following detailed description, numerous specific details are set forth in order to provide a thorough understanding of the invention. It will be understood by those skilled in the art, however, that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. Such an apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions. as described herein.

According to some embodiments of the present invention, there is provided a system and method for network access point authorization including an access policy module adapted to receive client authentication credentials from an access point through which the client is attempting to connect to network resources. According to some embodiments of the present invention, the policy module may be further adapted to respond to the access point based on data retrieved from a Remote Authentication Dial In User Service and from a Dynamic Security Data & Policy Database.

According to further embodiments of the present invention, the access policy module may be adapted to decide which methods of remotely connecting to a network are acceptable and which users/clients are allowed to access the network resources.

According to some embodiments of the present invention, a network may include various types of network resources, and a given network may include several distinct resources of the same type. Network resources may comprise software or hardware. A network resource may be associated with a state indicator, which may indicate the state of the resource.

According to some embodiments of the present invention, the access policy module may be part of a network access point authorization system. A network access point authorization system may also be referred to as a "Dynamic Security Authentication Service Proxy server" ("DSASP"). According to some further embodiments of the present invention, the DSASP may comprise: (1) an access policy module and (2) a Dynamic Security Data and Policy Database ("DSDPD"). According to further embodiments of the present invention, an access point through which a client is attempting to connect to network resources may have to complete an authorization and authentication process, which process may be performed by the access policy module. According to some embodiments of the present invention, an authentication and authorization process may include the step of sending an authorization request from an access point to an access policy module. According to some further embodiments of the present invention, an access point may be a VPN (Virtual Private Network), a client connected to a switch, a Dial-Up service, a WAP (wireless access point) or any other access point entity and/or program known today or to be devised in the future.

According to some further embodiments of the present invention, an authentication request may consist of credentials and/or information associated with the identity of the access point/client who attempts to log in to the network; an exemplary authorization request is the standard username and password parameters passed by a WAP. According to some further embodiments of the present invention, client authentication credentials may be issued by a Credential Service Provider ("CSP"), and may be associated with the user's details.

According to some embodiments of the present invention, the access policy module may be adapted to receive an authentication request. According to some further embodiments of the present invention, the access policy module may receive the authentication request via a Network Access Server (NAS), a VPN concentrator, a Wireless Access-Point and/or a switch.

According to yet further embodiments of the present invention, the access policy module may receive messages using RADIUS protocol, DIAMETER protocol, TACACS+ protocol and/or any other communication protocol known today or to be devised in the future.

According to some embodiments of the present invention, the access policy module may be adapted to retrieve authentication information from one or more authentication servers selected from the group of: (1) Security Authentication servers (SAS), (2) other Security Authentication proxy server and/or (3) any other security or Identity Management Directory.

According to some embodiments of the present invention, the access policy module may retrieve raw authentication information/data from the above mentioned directories (for example: via network connection or other) and process them using authentication schemes (for example: PAP, CHAP or EAP).

According to some further embodiments of the present invention, the access policy module may retrieve processed data from one or more authentication servers, which processed data may comprise an indicator for the authorization or the non-authorization of an access point according to the authentication server.

According to some embodiments of the present invention, the DSDPD module may be adapted to receive security information from a Network Security and Monitoring System ("NSMS"). According to some further embodiments of the present invention, an NSMS may be a detection and policy enforcement system or any other system that may be adapted to limit the access of end systems to a network (For example—intrusion prevention systems (IPS) or NAC policy enforcement systems).

According to some embodiments of the present invention, the DSDPD module may comprise a data base of security policy rules and a computational logic module functionally coupled with the data base of security policy rules and may be adapted to enforce the security policy rules. According to some further embodiments of the present invention, the security policy rules may define the system's security, i.e. a set of rules and constraints regarding the identity and parameters of end systems which may receive authorization by the network access point authorization system.

According to some embodiments of the present invention, the DSDPD module may process an authorization request based on: (1) authentication information retrieved from external security and authentication servers and (2) security information received from the NSMS.

According to some further embodiments of the present invention, the data base of security policy rules may be modified, i.e. modify the security policy of the system. According to yet further embodiments of the present invention, the modification of a security policy may be performed by: (1) an authorized user and/or (2) another authorized security policy system.

According to some embodiments of the present invention, the access policy module may determine an authorization level of an access point based on its security policy and authentication data. According to some embodiments of the present invention, the access policy module may decide that the access point is: (1) fully authorized to log in the network, (2) not-authorized to log in the network (3) partially authorized (authorized with restrictions), or (4) Quarantined for further policy verification.

According to some embodiments of the present invention, the network access point authorization system may send via the authentication proxy module: (1) an authorization (2) a non-authorization (3) a partial-authorization or (4) a quarantine message to the access point and network, According to yet further embodiments of the present invention, the access policy module may send and receive messages using RADIUS protocol, DIAMETER protocol and/or any other communication protocol known today or to be devised in the future.

An exemplary scenario of an access point which receives a partial-authorization may occur when a client tries to log in to the network via a switch. According to some further embodiments of the present invention, the DSPD may grant the client restricted access to the network in accordance with the client's credentials. An exemplary restricted access to network resources may be enforced by connecting to the network using a "restricted" vLAN.

According to some embodiments of the present invention, the DSPD may restrict access by choosing from a set of restricted vLAN's, for example, a qVLAN will stand for a Quarantine ULAN, which comprises certain limitations to the access given using this vLAN. According to further embodiments of the present invention, if additional compliance tests are required, the qVLAN may allow network access to the quarantined client while blocking all access from the quarantined client.

Figure 1:
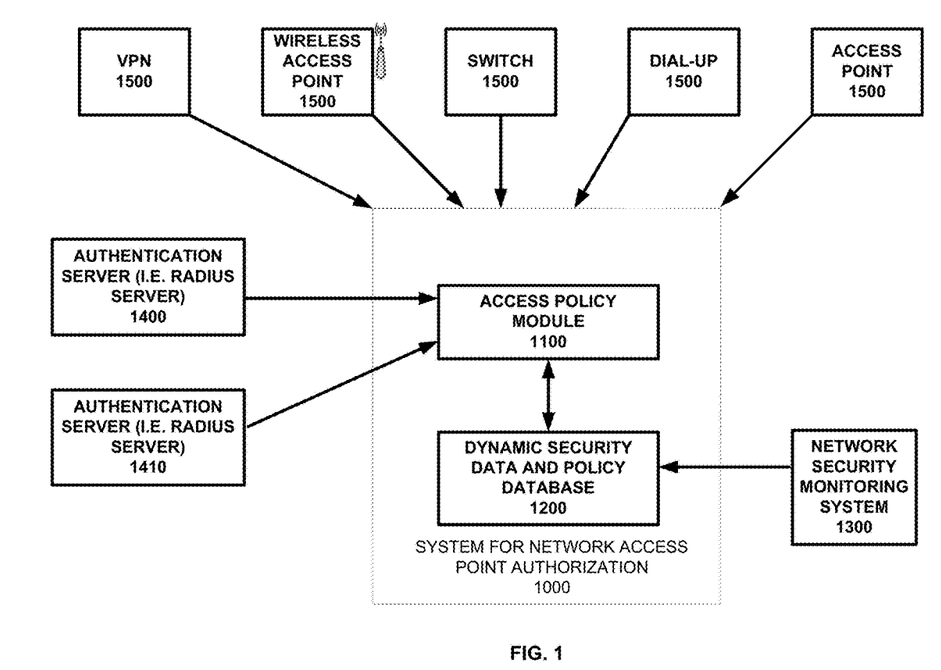
FIG. 1 is a schematic block diagram of a system for network access point authorization, wherein the system for network access point authorization is functionally coupled with one or more authentication servers and a Network Security Monitoring System, in accordance with some embodiments of the present invention.

Turning now to FIG. 1, there is shown a schematic block diagram of a system for network access point authorization 1000, wherein the system for network access point authorization is functionally coupled with one or more authentication servers (1400, 1410) and a Network Security and Monitoring System 1300 in accordance with some embodiments of the present invention.

According to some embodiments of the present invention, an authentication server (1400, 1410) may be a server used for network access control. The server may store the usernames and passwords that identify the clients/access points logging on, and/or it may hold the algorithms for associating user credentials/tokens. An authentication server may also provide access to specific network resources. The server may itself store user permissions and company policies or provide access to directories that contain the information. The most common protocols for authentication servers are RADIUS and TACACS. According to some embodiments of the present invention, the authentication server may be a stand-alone system or software that resides in an Ethernet switch, wireless access point (AP) or network access server (NAS).

According to some embodiments of the present invention, a Network Security and Monitoring System 1300 may be a detection and policy enforcement system or any other system that may be adapted to limit the access of end systems to a network (For example—intrusion prevention systems (IPS) or NAC policy enforcement systems).

According to some embodiments of the present invention, an access point 1500 may be a VPN (Virtual Private Network), a client connected to a switch, a Dial-Up service, a WAP (wireless access point) or any other access point entity and/or program known today or to be devised in the future.

According to some embodiments of the present invention, a system for network access point authorization 1000 may also be referred to as a "Dynamic Security Authentication Service Proxy server" ("DSASP"). According to some further embodiments of the present invention, the DSASP may comprise: (1) an access policy module 1100 and (2) a Dynamic Security Data and Policy Database ("DSDPD") 1200; the functionality of the system for network access point authorization 1000 may best be described in conjunction with FIG. 2, there is shown a flow chart depicting the steps of an exemplary system for network access point authorization, in accordance with some embodiments of the present invention.

Figure 2:
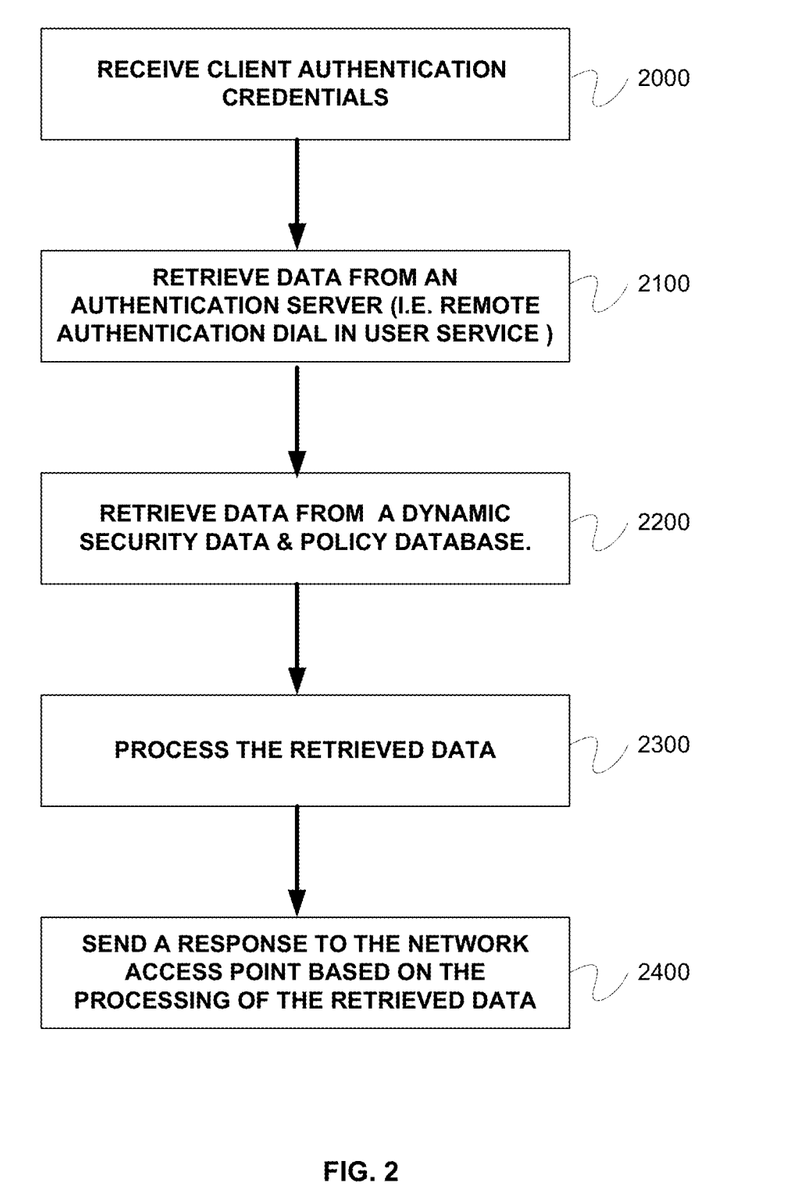
FIG. 2 is a flow chart depicting the steps of an exemplary system for network access point authorization, in accordance with some embodiments of the present invention.

According to some embodiments of the present invention, an access policy module 1100 may be adapted to receive a user's/client's authentication credentials from an access point 1500 (step 2000). According to some embodiments of the present invention, a client's authentication credentials is data associated with the identity of the access point/client who attempts to log in to the network, According to some further embodiments of the present invention, client authentication credentials may be issued by a Credential Service Provider ("CSP").

According to some embodiments of the present invention, an access policy module 1100 may be adapted to retrieve information from one or more authentication servers (1400 and 1410) as shown in step 2100. According to further embodiments of the present invention, access policy module 1100 may retrieve the information based on received client's authentication credentials.

According to some embodiments of the present invention, an access policy module 1100 may be adapted to retrieve data from a dynamic security data and policy data-base based on received client's authentication credentials (step 2200).

According to some embodiments of the present invention, an access policy module 1100 may be adapted to process the retrieved data (i.e. data retrieved from the authentication servers and from the DSDPD) and send a response to the access point 1500 which is attempting to access the network based on the processing of the retrieved data (steps 2300 and 2400).

Figure 3:
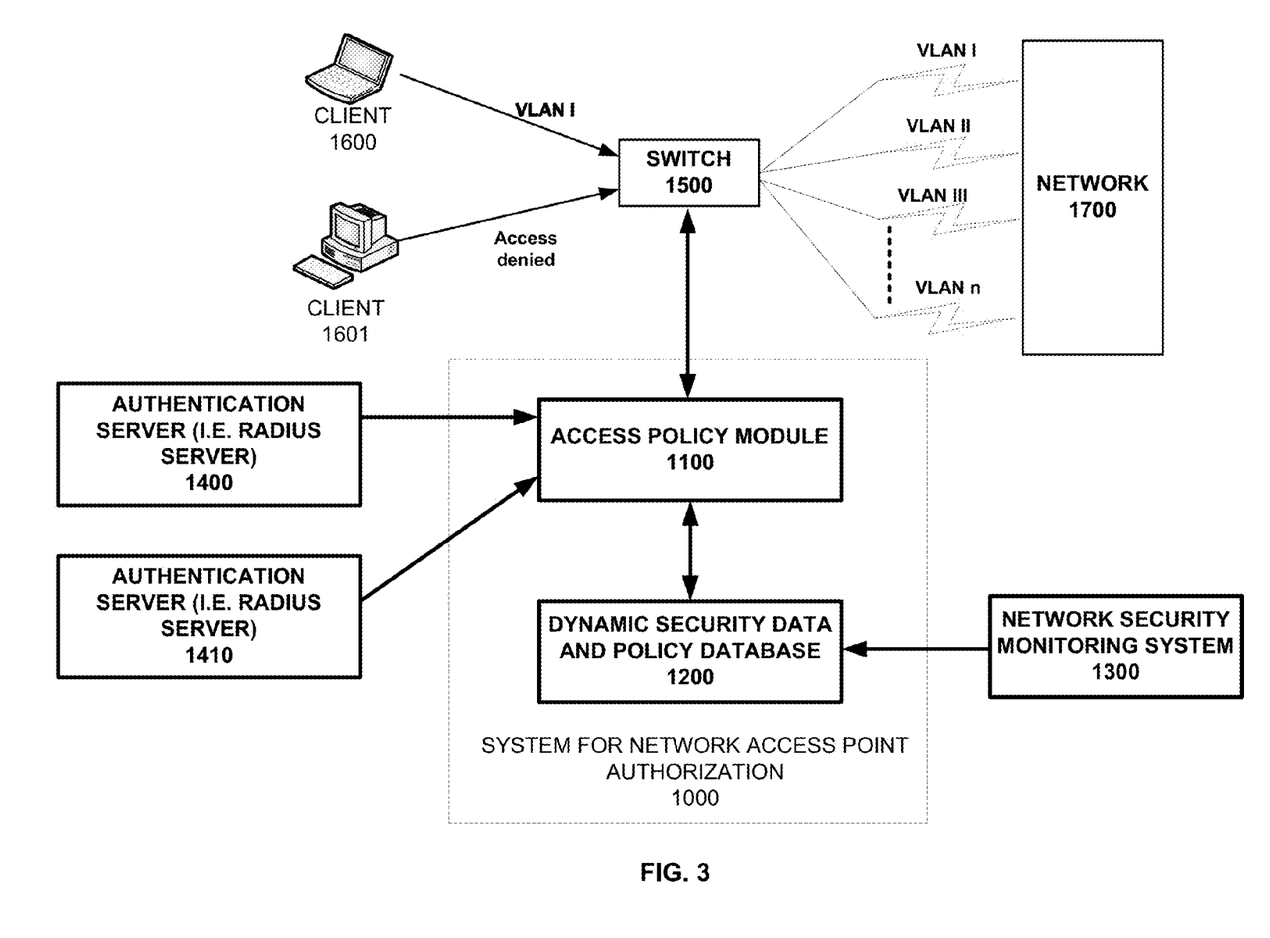
FIG. 3 is a schematic block diagram of a system for network access point authorization functionally coupled with one or more authentication servers and a Network Security and Monitoring System, wherein one or more clients are attempting to access a network via an access point, all in accordance with some embodiments of the present invention.

Turning now to FIG. 3, there is shown a schematic block diagram of a system for network access point authorization 1000 functionally coupled with one or more authentication servers (1400, 1410) and a Network Security and Monitoring System 1300. According to some embodiments of the present invention, one or more clients (1600 and 1601) may attempt to access a network 1700 via an access point 1500 (i.e. switch). According to some embodiments of the present invention, the functionality of the system shown in FIG. 3 may best be described in conjunction with the FIG. 4, there is shown a flow chart depicting the steps of an exemplary embodiment of the present invention.

Figure 4:
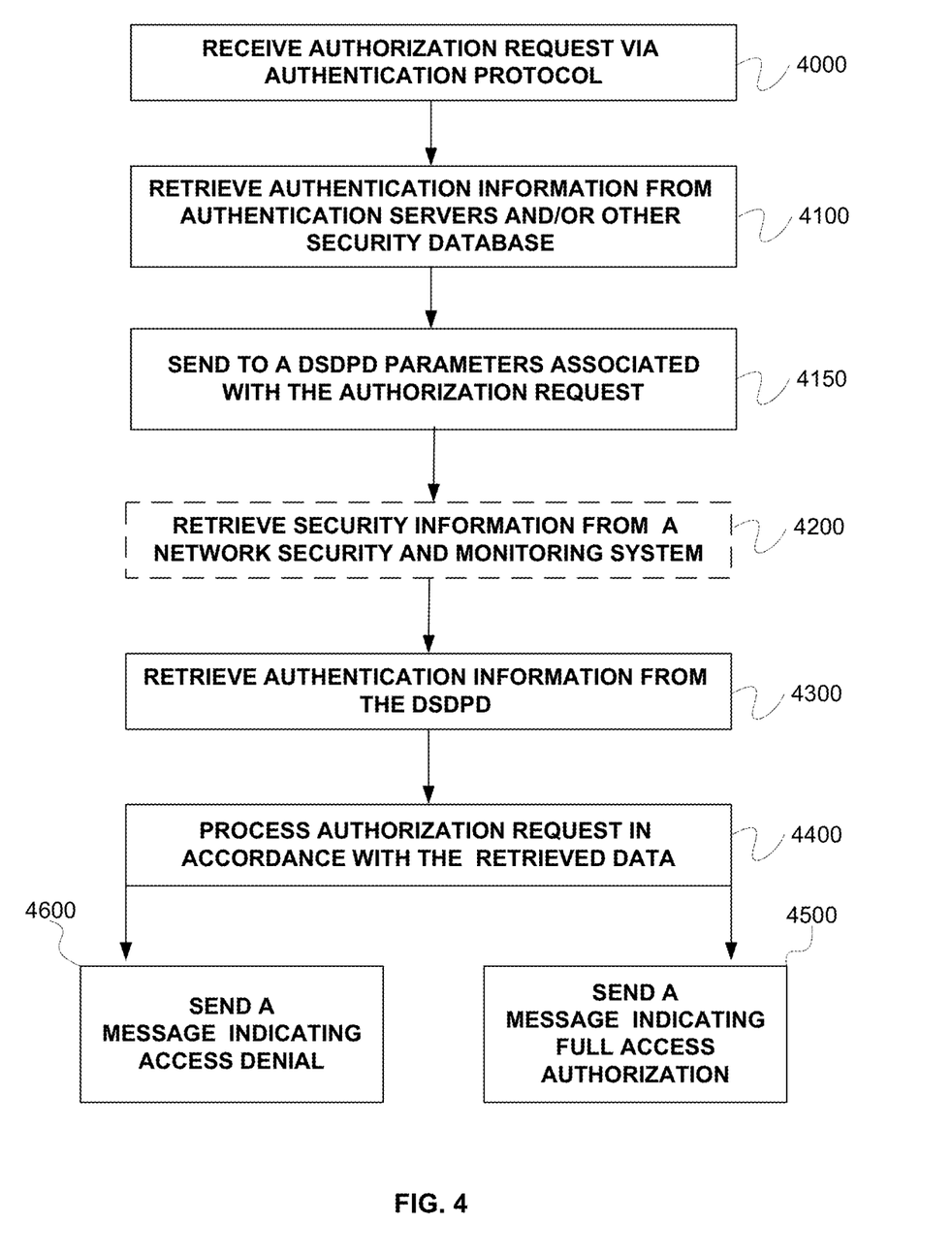
FIG. 4 is a flow chart depicting the steps of an exemplary embodiment of the present invention.

According to some embodiments of the present invention, an access policy module 1100 may be adapted to receive an authorization request (step 4000) associated with a user/client (1600, 1601) which is attempting to access network 1700 via an access point 1500 (i.e. switch). According to some embodiments of the present invention, the authorization request may include authentication credentials which may be associated with the identity of the client/user who attempts to access network 1700, According to some embodiments of the present invention, access policy module 1100 may be adapted to retrieve authentication information from one or more authentication servers (1400 and 1410) as shown in step 4100, According to further embodiments of the present invention, access policy module 1100 may retrieve the authentication information based on received client's authentication credentials.

According to some embodiments of the present invention, access policy module 1100 may be adapted to notify a DSDPD of the received user credentials (step 4150). Notifying the DSDPD may include sending parameters associated with the user's credentials that may be used for identification of the user's (i.e. MAC address).

According to some embodiments of the present invention, the dynamic security data and policy database may be adapted to retrieve security information from a network security and monitoring system ("NSMS") based on the parameters associated with the authorization request as shown in step 4200. According to some further embodiments of the present invention, DSDPD may send the retrieved information to the access policy module (step 4300). According to some further embodiments of the present invention, an NSMS may be a detection and policy enforcement system or any other system that may be adapted to limit the access of end systems to a network (For example—intrusion prevention systems (IPS) or NAC policy enforcement systems).

According to some embodiments of the present invention, access policy module 1100 may be adapted to process the retrieved data (i.e. data retrieved from the authentication servers and from the DSDPD) and send a response to the access point 1500 which is attempting to access the network, based on the processing of the retrieved data (step 4400).

According to some embodiments of the present invention, access policy module 1100 may be adapted to send a message to the access point regarding a client who is attempting to access a network 1700 using the access point, which message may indicate what access level to the network is granted to the client/user. According to further embodiments of the present invention, access policy module may send the access point a message, associated with an authorization request, indicating that full access is granted to the user/client, or a message indicating that access to the network is denied for the associated authorization request (steps 4500, 4600).

For example, a client 1600 may send a first authorization request, and a client 1601 may send a second authorization request. The first and second authorization requests may be processed by system 1000 as explained hereinabove. According to some embodiments of the present invention, access point 1500 may provide access to the network using different Vlans. According to some embodiments of the present invention, system 1500 may send the access point a first message associated with the first authorization request indicating that the user/client which is associated with the first authorization request (i.e. user 1600) is granted full access to network 1700. According to some further embodiments of the present invention, system 1500 may send the access point a second message associated with the second authorization request indicating that the user/client which is associated with the second authorization request (i.e. user 1601) is denied access to network 1700.

Figure 5:
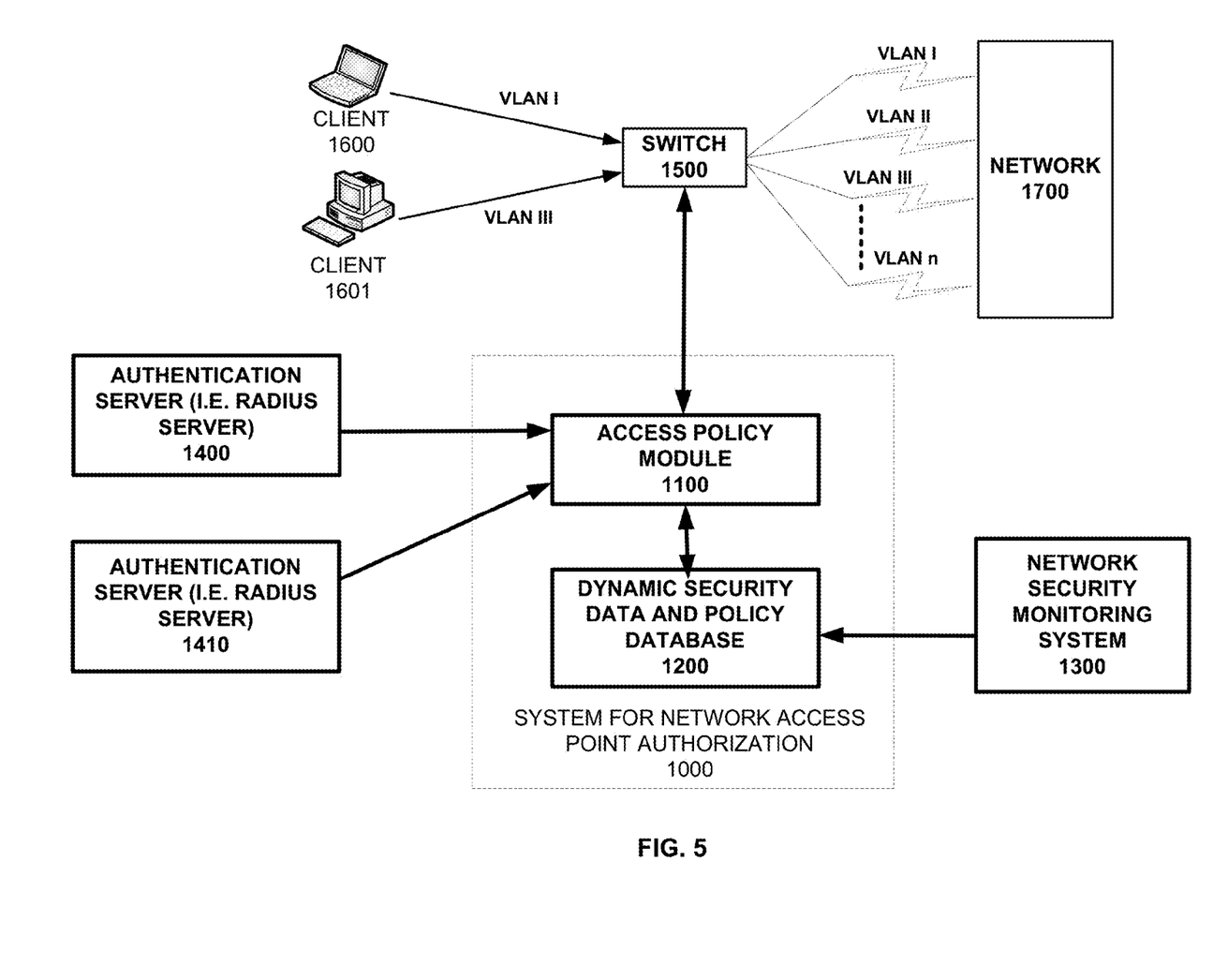
FIG. 5 is a schematic block diagram of a system for network access point authorization functionally coupled with one or more authentication servers and a Network Security and Monitoring System, wherein one or more clients are attempting to access a network via an access point, all in accordance with some embodiments of the present invention.

Turning now to FIG. 5, there is shown another schematic block diagram of a system for network access point authorization 1000 functionally coupled with one or more authentication servers (1400, 1410) and a Network Security and Monitoring System 1300. According to some embodiments of the present invention, one or more clients (1600 and 1601) may attempt to access a network 1700 via an access point 1500 (i.e. switch). The functionality of the system shown in FIG. 5 may best be described in conjunction with the FIG. 6, there is shown a flow chart depicting the steps of an exemplary embodiment of the present invention.

Figure 6:
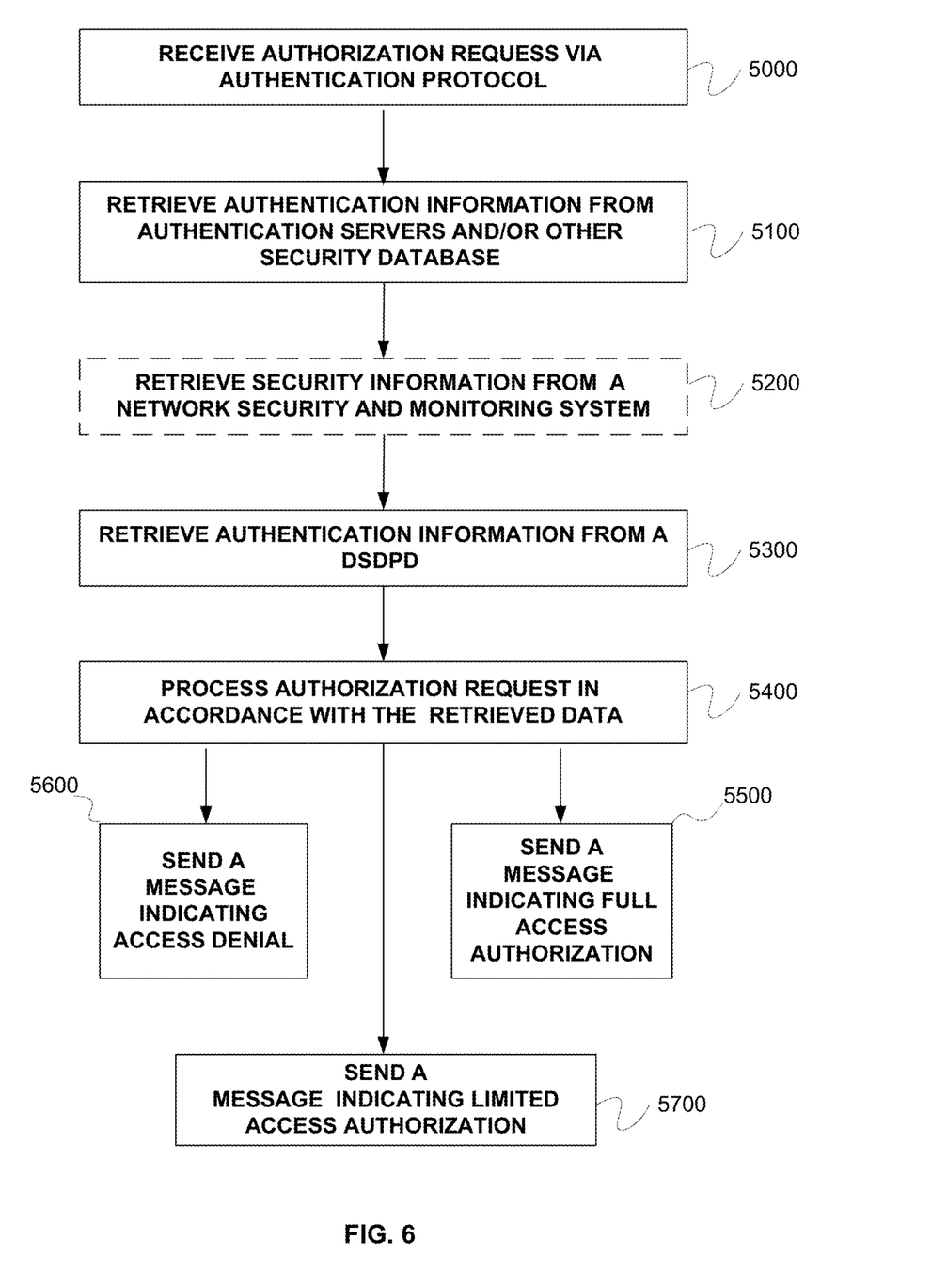
FIG. 6 is a flow chart depicting the steps of an exemplary embodiment of the present invention.

According to some embodiments of the present invention, an access policy module 1100 may be adapted to receive an authorization request (step 5000) associated with a user/client (1600, 1601) which is attempting to access network 1700 via an access point 1500 (i.e. switch). According to some embodiments of the present invention, the authorization request may include authentication credentials which may be associated with the identity of the client/user who attempts to access network 1700, According to some embodiments of the present invention, access policy module 1100 may be adapted to retrieve authentication information from one or more authentication servers (1400 and 1410) as shown in step 5100. According to further embodiments of the present invention, access policy module 1100 may retrieve the authentication information based on the received client's authentication credentials.

According to some embodiments of the present invention, access policy module 1100 may be adapted to notify a DSDPD of the received user credentials (step 5150). Notifying the DSDPD may include sending parameters associated with the user's credentials that may be used for identification of the user's (i.e. MAC address).

According to some embodiments of the present invention, the dynamic security data and policy database may be adapted to retrieve security information from a network security and monitoring system ("NSMS") based on the parameters associated with the authorization request as shown in step 5200. According to some further embodiments of the present invention, DSDPD may send the retrieved information to the access policy module (step 5300). According to some further embodiments of the present invention, an NSMS may be a detection and policy enforcement system or any other system that may be adapted to limit the access of end systems to a network (For example—intrusion prevention systems (IPS) or NAC policy enforcement systems).

According to some embodiments of the present invention, access policy module 1100 may be adapted to process the retrieved data (i.e. data retrieved from the authentication servers and from the DSDPD) and send a response to the access point 1500 which is attempting to access the network, based on the processing of the retrieved data (step 5400).

According to some embodiments of the present invention, access policy module 1100 may be adapted to send a message to the access point regarding a client who is attempting to access a network 1700 using the access point, which message may indicate what access level to the network is granted to the client/user. According to further embodiments of the present invention, access policy module may send the access point a message, associated with an authorization request, indicating that full access is granted to the user/client, or a message indicating that access to the network is denied for the associated authorization request (steps 5500, 5600 and 5700).

For example, a client 1600 may send a first authorization request, and a client 1601 may send a second authorization request. The first and second authorization requests may be processed by system 1000 as explained hereinabove. According to some embodiments of the present invention, access point 1500 may provide access to the network using different Vlans. According to further embodiments of the present invention, each Vlan may be associated with a different access level, i.e. full access to all of the network resources or limited access to a portion of the network resources. According to some embodiments of the present invention, system 1500 may send the access point a first message associated with the first authorization request indicating that the user/client which is associated with the first authorization request (i.e. user 1600) is granted with a first access authorization level to network 1700, which access authorization level is associated with Vlan 1. According to some further embodiments of the present invention, system 1500 may send the access point a second message associated with the second authorization request indicating that the user/client which is associated with the second authorization request (i.e. user 1601) is granted with a second access authorization level to network 1700, which access authorization level is associated with Vlan 3.

Figure 7:
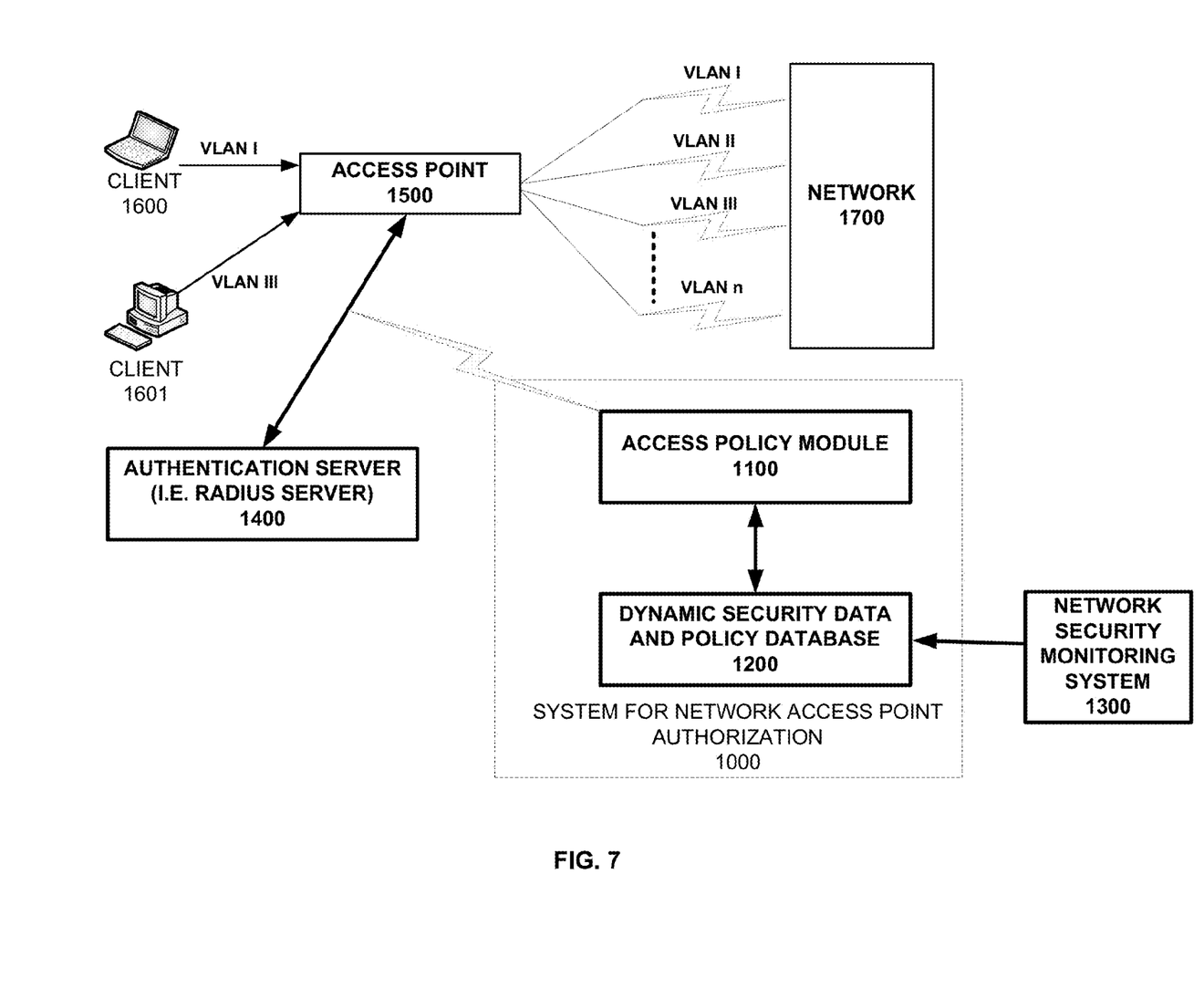
FIG. 7 is a schematic block diagram of a system for network access point authorization functionally coupled with one or more authentication servers and a Network Security and Monitoring System. According to some embodiments of the present invention, the system for network access point authorization may be adapted to listen (i.e. "sniffing") to the communication between the access point and the authentication server.

Turning now to FIG. 7, there is shown a schematic block diagram of a system for network access point authorization 1000 functionally coupled with one or more authentication servers (1400, 1410) and a Network Security and Monitoring System 1300, According to some embodiments of the present invention, one or more clients (1600 and 1601) may attempt to access a network 1700 via an access point 1500 (i.e. switch). According to some embodiments of the present invention, the system for network access point authorization 1000 may be adapted to listen (i.e. "sniffing") to the communication between the access point and the authentication server, which communication is described herein above and is outlined in known authentication protocols. The functionality of the system for network access point authorization 1000 may best be described in conjunction with FIG. 8, there is shown a flow chart depicting the steps of an exemplary embodiment of the present invention.

Figure 8:
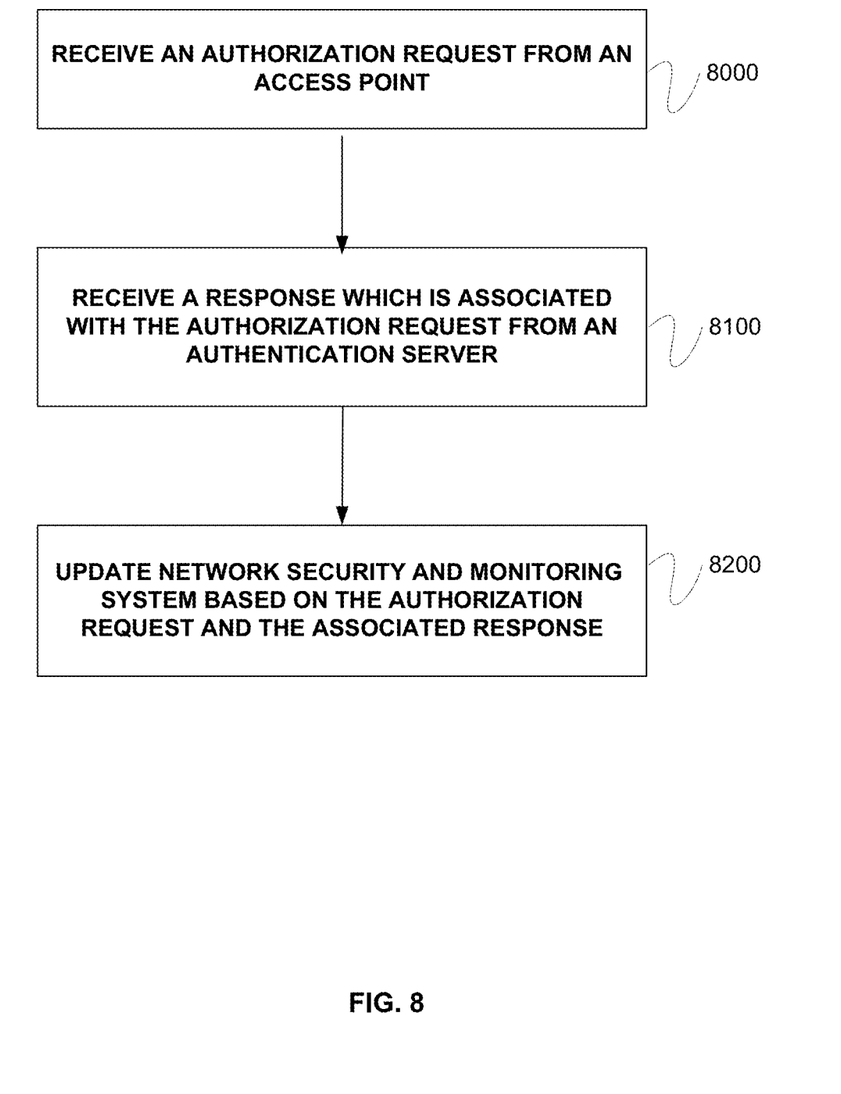
FIG. 8 is a flow chart depicting the steps of an exemplary embodiment of the present invention.

According to some embodiments of the present invention, the system for network access point authorization 1000 may be adapted to receive an authorization request from an access point (step 8000). According to yet further embodiments of the present invention, the system for network access point authorization 1000 may be adapted to receive a response which is associated with the authorization request from an authentication server (step 8100). According to yet further embodiments of the present invention, system for network access point authorization 1000 may be adapted to update a network security and monitoring system (1300) based on the received authorization request and its associated response (step 8300). The update to the network security and monitoring system may include the following details:

a. Who requested the authentication;
b. When the authentication request was initiated;
c. Was the authentication successful;
d. Type of authentication requested;
e. What authorization has been granted; and
f. Other properties depending on the used protocol.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A data network access security system for regulating access via access points to resources on a data network, said system comprising:
   a network security and monitoring system (NSMS) comprising processing circuitry communicatively coupled to the network and configured to monitor access of end systems to the network via one or more access points, wherein an access point is any network device adapted to provide computational devices access to the network; and
   a Dynamic Security Authentication Service Server (DSASS) comprising processing circuitry communicatively coupled to the network, the one or more access points, said NSMS and an authentication server external to said DSASS, said DSASS including:
  a Dynamic Security Data & Policy Database (DSDPD), which DSDPD includes rules indicating network resource access provisions to be applied to a given device based on: (a) compliance of the given device with specific security policies; (b) security information received from said NSMS and (c) authentication information received from the authentication server
  an access policy module adapted to:
    (1) receive authentication credentials of a user, from an access point through which the user is attempting to connect to network resources using a first device,
    (2) cause the access point to initially grant the first device quarantined access to the network based on (i) data received from the authentication server in relation to the authentication credentials and (ii) compliance data associated with the first device received from said DSDPD;
    (3) after the first device has been granted quarantined access, facilitate further compliance testing of the first device via the quarantined access;
    (4) determine access to network resources to be granted to the first device based on results of the further compliance testing and the data received from: (i) the authentication server external to said DSASS and (ii) said DSDPD; and
    (5) cause the access point to grant the first device the determined access to the network resources.

2. The system according to claim 1, wherein the access policy module is adapted to receive messages using RADIUS protocol, DIAMETER protocol or TACACS+ protocol.

3. The system according to claim 2, wherein the access points are selected from the group consisting of: switch, a VPN, a WAP, and a Dial-Up service.

4. The system according to claim 1, wherein said network security and monitoring system comprises an intrusion prevention system or an intrusion detection system.

5. The system according to claim 1, wherein the authentication server is selected from the group consisting of: a Remote Authentication Dial in Service (RADIUS) server, a TACACS+ server and a DIAMETER server.

6. The system according to claim 1, wherein said network security and monitoring system comprises a Network Access Control system.

7. The system according to claim 6, wherein said DSASS is a Dynamic Security Authentication Service Proxy Server.

8. The system according to claim 1, wherein said network security and monitoring system is selected from the group consisting of: an intrusion prevention system (IPS) and a Network Access Control (NAC) policy enforcement system.

9. The system according to claim 1, wherein said quarantined access to the network includes allowing network access to the quarantined device while blocking all access from the quarantined device.

10. A method for regulating access via access points to resources on a data network, said method comprising:
  receiving authentication credentials from an access point through which a device is attempting to connect to network resources;
  retrieving data from an authentication server;
  retrieving data from a Dynamic Security Data & Policy Database (DSDPD), which DSDPD includes rules indicating network resource access provisions to be applied to a given device based on: (1) compliance of the given device with specific security policies and (2) security information said DSDPD retrieves from a network security and monitoring system (NSMS) comprising processing circuitry communicatively coupled to the network and configured to monitor access of end systems to the network via one or more access points;
  performing a first processing of the retrieved data from the authentication server and the DSDPD, wherein said first processing is computed according to a dynamic security policy; and
  sending a response to the network access point granting the first device quarantined access to the network, based on the processing of the retrieved data;
  performing further compliance testing of the first device via the quarantined access;
  re-determining access to network resources to be granted to the first device based on results of the further compliance testing and a second processing of the retrieved data from the authentication server and the DSDPD.

11. The method according to claim 10, further comprising receiving messages using RADIUS protocol, DIAMETER protocol or TACACS+ protocol.

12. The method according to claim 10, wherein the access point is selected from the group consisting of: a switch, a VPN, a wireless access point, a dial up service.

13. The method according to claim 10, wherein said network security and monitoring system comprises an intrusion prevention system or an intrusion detection system.

14. The method according to claim 10, wherein the authentication server is selected from the group consisting of: a Remote Authentication Dial in Service (RADIUS) server, a TACACS+ server and a DIAMETER server.

15. The method according to claim 10, wherein said network security and monitoring system comprises a Network Access Control (NAC) system.

16. The method according to claim 10, wherein said network security and monitoring system is selected from the group consisting of: an intrusion prevention system (IPS) and a Network Access Control (NAC) policy enforcement system.

17. The method according to claim 10, wherein said granting quarantined access to the network includes allowing network access to the quarantined device while blocking all access from the quarantined device.

18. A data network access security system for regulating access via access points to resources on a data network, said system comprising:
  a network security and monitoring system (NSMS) comprising processing circuitry communicatively coupled to the network and configured to monitor access of end systems to the network via one or more access points; and
  a Dynamic Security Authentication Service Server (DSASS) comprising processing circuitry communicatively coupled to the network, the one or more access points, said NSMS and an authentication server external to said DSASS, said DSASS including:
    a Dynamic Security Data & Policy Database (DSDPD), which DSDPD includes rules indicating network resource access provisions to be applied to a given device based on: (a) compliance of the given device with specific security policies; (b) security information received from said NSMS and (c) authentication information received from the authentication server external to said DSASS;

an access policy module adapted to:
- (1) receive authentication credentials of a user, from an access point through which the user is attempting to connect to network resources using a first device,
- (2) cause the access point to initially grant the first device quarantined access to the network based on data received from: (i) the authentication server external to said DSASS and (ii) said DSDPD;
- (3) after the first device has been granted quarantined access, facilitate compliance testing of the first device via the quarantined access;
- (4) determine access to network resources to be granted to the first device based on results of the compliance testing and the data received from: (i) the authentication server external to said DSASS and (ii) said DSDPD; and
- (5) cause the access point to grant the first device the determined access to the network resources.

19. The system according to claim 18, wherein said quarantined access to the network includes allowing network access to the quarantined device while blocking all access from the quarantined device.

20. The system according to claim 18, wherein said DSASS is a Dynamic Security Authentication Service Proxy Server.

* * * * *